UNITED STATES PATENT OFFICE.

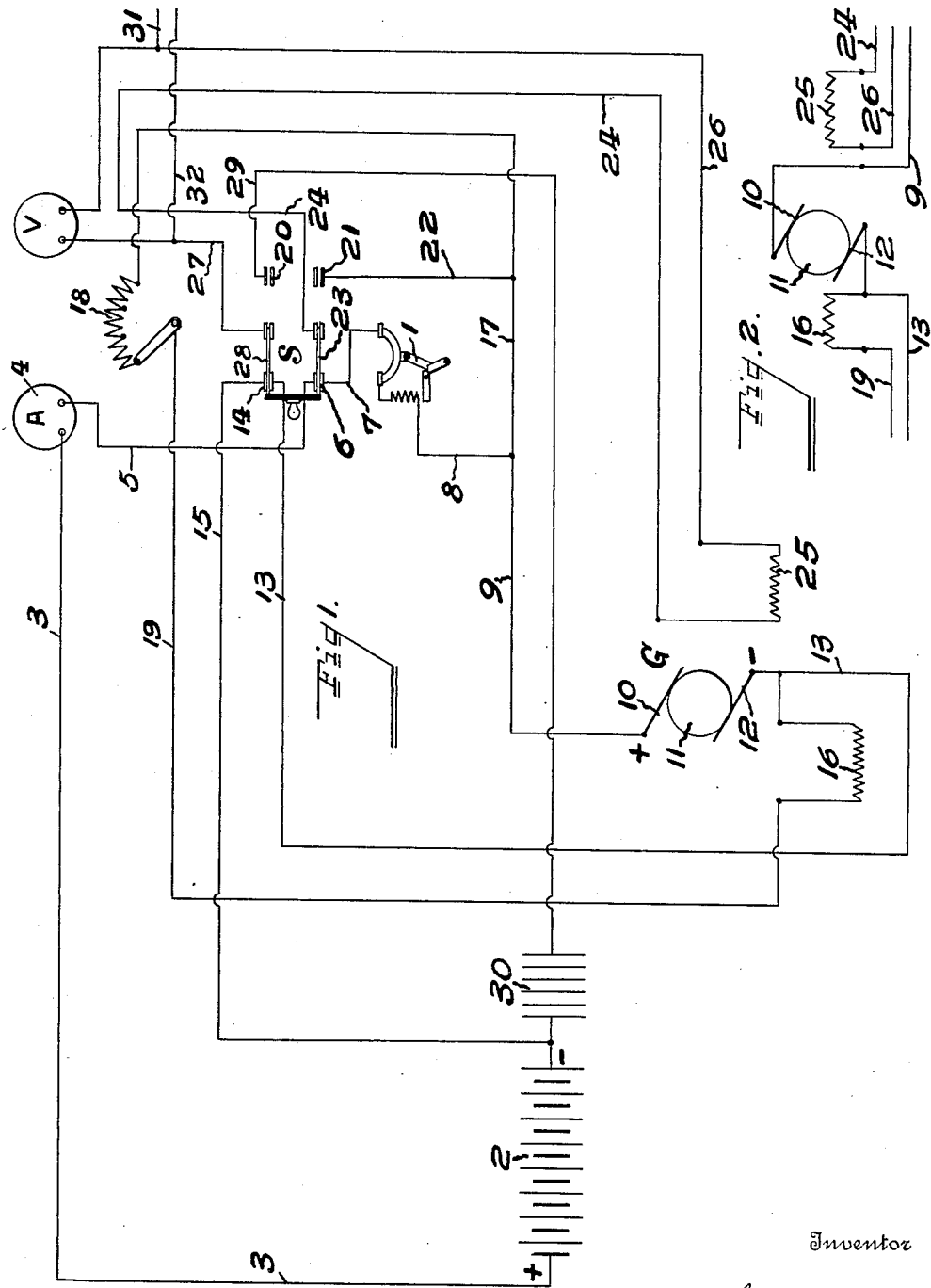

MILTON H. GRAY, OF SPRINGFIELD, OHIO.

CIRCUIT FOR ELECTRIC LIGHTING OR POWER.

1,093,615.  Specification of Letters Patent.  Patented Apr. 21, 1914.

Application filed November 5, 1912.  Serial No. 729,597.

*To all whom it may concern:*

Be it known that I, MILTON H. GRAY, a citizen of the United States, residing at Springfield, in the county of Clark and State of Ohio, have invented certain new and useful Improvements in Circuits for Electric Lighting or Power, of which the following is a specification.

This invention relates to electric lighting or power circuits, and the object of the invention is to provide a simple and efficient electric lighting or power circuit in connection with a generator (especially when driven by a small internal combustion engine), and a storage battery, the arrangement being such that the light or power circuit may be supplied with current either from the generator or battery alone or from both and that the battery may be charged from the engine independently of the lighting or power circuit or when supplying current to the lighting or power circuit, the generator also being adapted for use as a motor for the purpose of starting the engine. I accomplish this by the arrangement of parts shown in the accompanying drawings in which—

Figure 1 is a diagrammatic view of the circuits and connections; and Fig. 2 is a diagrammatic view of the generator circuits.

Like parts are represented by similar characters of reference in the several views.

In carrying out this invention, I use an ordinary compound wound generator with no internal taps on the series field leads, a circuit breaker, and a double-pole double-throw switch as the essential features; the usual starting rheostat and meters being provided.

The generator which I use does not differ from an ordinary generator except that it is preferably arranged so that the terminals of the shunt winding, the brushes and the series winding are all brought to the outside of the frame of the machine, as shown in Fig. 2, in which 10 and 12 represent the brushes, 11 the commutator, 16 the shunt winding, and 25 the series winding. This makes six terminals instead of the four on machines as usually set up. In this arrangement, generally speaking, the power circuit is connected directly in series with the series winding, which circuit is also connected to the terminals of the respective arms of the double-pole double-throw switch. The respective poles of the battery are connected directly to one set of the switch sockets, and the brushes of the generator are connected in multiple with the battery to the same sockets; one of these brushes, however, being connected to its socket through the circuit breaker. One of the brushes and one pole of the battery are also connected to the respective terminals of the other set of switch sockets through counter electromotive force cells. If the double-pole double-throw switch, therefore, is open or in what I will call the neutral or first position, the light or power circuit from the series winding of the generator will be cut off, and, when in this position, if the circuit breaker be closed, the generator, with its shunt winding only, will be connected in series with the battery, and, if the generator is at rest, the battery will operate the generator as a motor to start the engine and when running up to speed the generator will charge the battery.

With the switch thrown to the sockets connected to the generator terminals, or what I will call the second position, with the circuit breaker open, the generator alone will be connected to the power circuit to supply current thereto, through the counter electromotive force which represents approximately the difference in the voltage of the battery in charging and discharging. With the circuit breaker closed the generator will be connected in multiple to the light or power circuit and the battery with the counter electromotive force between the generator and light circuit, but without such counter electromotive force between the generator and battery. Hence current will be fed from the generator to charge the battery and at the same time to the light or power circuit without excessive voltage on the latter. With the switch closed through the multiple generator and battery connections, which I will call the third position, the power circuit will be connected to these terminals, and, with the circuit breaker open, the battery alone will be connected directly to the light or power circuit, and, with the circuit breaker closed, the generator and battery will be connected in parallel to the light or power circuit. In this third position, therefore, either the battery alone or the battery operating in parallel with the generator will be connected to the power circuit. The battery in this case would act as a regulator and would receive or discharge current from the line supplied by the generator, depending upon the load.

With this general explanation, a detailed description of the operation of the devices and the circuits will show the particular connections and arrangements of the circuits and apparatus.

Reference being had to the drawings, 1 is the circuit breaker; 2 the battery; S the double-pole double-throw switch; 4 the ammeter A; V the voltmeter; and G the generator. With the switch open or in neutral position and the circuit breaker 1 closed, the generator G will be in circuit with the battery as follows: from the positive pole of the battery 2 through wire 3, ammeter 4, wire 5, switch socket 6, wire 7, circuit breaker 1, wires 8 and 9, generator brush 10, commutator 11, brush 12, wire 13, switch socket 14, wire 15, to opposite pole of battery 2; the shunt winding 16 being connected in a shunt of the brushes by having one of its terminals connected directly to a terminal of the brush 12 and its other terminal connected by the wire 19, rheostat 18 and wires 17 and 9 to brush 10. With the switch in neutral, or first position, if the circuit breaker 1 is closed, therefore, with the generator at rest, the current from the battery passing through the circuit described will start the generator, and, if connected to an internal combustion engine, will also start the engine, thus obviating the necessity of cranking. When the engine has acquired enough speed so that the generator furnishes voltage sufficient to overcome the electromotive force of the battery, then it will charge the battery. This may be termed the first position or first condition under which the apparatus operates.

With the condition above described, if it is desired to furnish current from the generator to the light or power circuit, the switch will be thrown over to the right or the second position with the arms 23 and 28 thereof engaging respectively the sockets 20 and 21. The generator brushes are connected to these respective sockets as follows: from brush 10, wires 9, 17 and 22 to socket 21; and from brush 12 by wire 13, socket 14, wire 15, counter electromotive force device 30, wire 29 to socket 20. One side of the translation circuit is connected to the arm 28 by wires 27 and 32 and the other side is connected to the other arm 23 by wire 24, series winding 25 and wires 26 and 31. With the circuit breaker open, the generator will supply current to the power circuit alone through the circuit just described. If in this position the circuit breaker be closed, the generator will be connected in multiple to the battery and light or power circuit, by the circuit just described to the light or power circuit, and from wire 9 through wire 8, circuit breaker 1, wire 7, socket 6, wire 5, ammeter 4, wire 3, positive pole of battery 2, and from wire 15 to the negative pole of the battery 2. The generator being connected in multiple to the battery and power circuit with the counter electromotive force 30 between the generator and power circuit, the generator will furnish current to both the battery and the light or power circuit so as to charge the battery and supply current to the light or power circuit without excess voltage on the power circuit.

With the generator at rest, current may be supplied from the battery alone to the power circuit by throwing the switch to the left or third position with the circuit breaker 1 open, by following circuit: battery 2 through wire 3, ammeter 4, wire 5, terminal 6, switch arm 23, wire 24, series winding 25, wire 26, circuits 31 and 32, wire 27, switch arm 28, terminal 14, wire 15, to battery; the circuit from the generator through wires 9 and 8 being broken at the circuit breaker 1. In this third position, with the generator running, if the circuit breaker is closed, the generator and battery will be connected in parallel with the light circuit, the battery being connected over the circuit last described and the generator, from brush 10, wires 9 and 8, circuit breaker 1, wire 7, to switch socket 6, and from brush 12 and wire 13 to switch socket 14. In this position, the generator and battery can both be used to supply current to the power circuit, the battery acting in this case more or less as a regulator to furnish current to the power circuit or absorb it from the generator, depending on the changes in the resistance of the light or power circuit.

It will be noticed that the series winding 25 is always in series with the lighting circuit, but is never in series with the charging circuit, and by charging circuit, I mean the circuit between the generator and battery, and by the lighting or power circuit, I mean the circuit from the terminals of the switch whether passing from the battery or from the generator. Consequently the direction of the current through the series winding is always the same and there is, therefore, no possibility of reversing the polarity of the generator which will occur when the series winding is connected in the usual way and the machine used both as a generator and a motor in connection with a storage battery, since when used as a motor with the series winding normal, the current will flow through the series field in an opposite direction from that in which it flows when the machine is used as a generator, while in the shunt winding, it flows in the same direction whether the machine is being used as a generator or motor.

It will be seen that by the arrangement of the circuits and apparatus thus described, I am able to secure a very simple circuit of few parts especially adapted for lighting plants where the motive power is furnished by a small internal combustion engine or some motor in connection with a storage battery, it being possible by this arrangement to use the generator as a motor, to use the generator for charging the battery alone or supplying the light or power circuit alone, or for supplying the light or power circuit and the battery at the same time, or to furnish current from the battery alone.

Having thus described my invention, I claim:—

1. In a circuit, as described, the combination with a generator having a series winding and a battery, of a double-throw two-pole switch having terminals, a circuit breaker, one pair of terminals of said switch being connected to the poles of said battery and the other to the poles of said generator through said circuit breaker, and a translation circuit connected to the poles of said switch in series with the series winding of said generator.

2. In an arrangement such as described, the combination of a generator and a storage battery, a circuit breaker, a double-pole double-throw switch with the poles of said battery connected to one set of terminals of said switch and through said circuit breaker to the terminals of said generator, a translation circuit connected in series with the series winding of said generator to the poles of said switch, a connection from said generator to the opposite pair of terminals of said switch and said battery, and a counter electromotive force in said circuit between said generator and one of said terminals, as and for the purpose specified.

3. In an arrangement such as described, a generator and battery, a double-pole switch, a circuit breaker, a connection from the poles of said battery to the terminals of said switch and from said generator through said circuit breaker to the same terminals, a shunt winding and a series winding for said generator, the series winding being in series with a translation circuit, and the shunt winding in parallel with the battery circuit when the circuit breaker is closed, said switch being adapted when closed in one position to connect said battery and in the other position to connect said generator to said translation circuit with the circuit breaker open, and to connect said battery and generator in parallel to said translation circuit with the circuit breaker closed, and when in neutral position to connect said battery and generator independently of the translation circuit when the circuit breaker is closed.

4. In an arrangement such as described, a generator and storage battery, a double-pole double-throw switch and a circuit breaker, a translation circuit connected to the poles of said switch and a connection from the poles of the battery and generator respectively to one set of the switch terminals with the generator connection passing through the circuit breaker and a connection from the poles of said generator to the other set of switch terminals with one of said connections passing through a counter electromotive force, whereby, with the switch in neutral position, the generator and battery may be connected through the circuit breaker and with the switch in one position the generator and battery may be connected in parallel to the lighting circuit with the circuit breaker closed and the battery alone connected with the lighting or power circuit with the circuit breaker open and with the switch in the other position, the generator alone can be connected to the lighting circuit with the circuit breaker open, and with the circuit breaker closed, the generator will be connected in multiple to the lighting circuit and to the battery with the counter electromotive force between the generator and power circuit, whereby the generator will furnish current to light the circuit and to charge the battery without increasing the voltage on the lighting circuit.

5. In an arrangement such as described, the combination of a generator, storage battery and switching device and translation circuit, said generator having a series winding which is connected in series with the translation circuit, said switching device being arranged to connect the battery or generator or both to said translation circuit with the series winding in circuit therewith, and means for connecting the generator to said series winding whereby the generator is used as a shunt machine when charging and as a compound machine when furnishing current for other purposes.

In testimony whereof, I have hereunto set my hand this 31st day of October, 1912.

MILTON H. GRAY.

Witnesses:
CHAS. I. WELCH,
ESTHER E. PFEIFER.

Copies of this patent may be obtained for five cents each, by addressing the "Commissioner of Patents, Washington, D. C."